(12) United States Patent
Parmeter et al.

(10) Patent No.: US 7,987,913 B2
(45) Date of Patent: Aug. 2, 2011

(54) ELECTRICAL SUBMERSIBLE PUMP WITH EQUALLY LOADED THRUST BEARINGS AND METHOD OF PUMPING SUBTERRANEAN FLUID

(75) Inventors: Larry J. Parmeter, Broken Arrow, OK (US); Scott C. Strattan, Broken Arrow, OK (US); David W. Chilcoat, Jenks, OK (US)

(73) Assignee: Baker Hughes Incorporated, Houston, TX (US)

( * ) Notice: Subject to any disclaimer, the term of this patent is extended or adjusted under 35 U.S.C. 154(b) by 152 days.

(21) Appl. No.: 12/238,649

(22) Filed: Sep. 26, 2008

(65) Prior Publication Data

US 2010/0078177 A1 Apr. 1, 2010

(51) Int. Cl.
| | |
|---|---|
| *E21B 43/00* | (2006.01) |
| *F16C 17/04* | (2006.01) |
| *F04B 17/00* | (2006.01) |
| *F04B 35/04* | (2006.01) |

(52) U.S. Cl. ........ 166/370; 166/107; 384/420; 417/365; 417/423.12

(58) Field of Classification Search .......... 166/370, 166/105, 107; 384/303, 248, 420; 417/365, 417/423.12, 424.2
See application file for complete search history.

(56) References Cited

U.S. PATENT DOCUMENTS

| | | | | |
|---|---|---|---|---|
| 1,169,206 | A | * | 1/1916 | Sydney ..................... 384/101 |
| 2,621,090 | A | * | 12/1952 | Lakey ...................... 384/308 |
| 3,154,355 | A | * | 10/1964 | McCafferty ............... 384/304 |
| 3,158,415 | A | | 11/1964 | Gardner |
| 3,183,048 | A | | 5/1965 | Komor |
| 3,326,612 | A | | 6/1967 | Schaefer |
| 3,720,271 | A | * | 3/1973 | Kern ........................... 175/57 |
| 4,033,647 | A | | 7/1977 | Beavers |
| 4,227,865 | A | * | 10/1980 | Erickson et al. .......... 417/365 |
| 4,275,938 | A | | 6/1981 | Roberts |
| 4,363,608 | A | | 12/1982 | Mulders |
| 4,669,961 | A | * | 6/1987 | Lorett ........................... 418/1 |
| 5,667,314 | A | | 9/1997 | Limanowka et al. |
| 5,722,812 | A | | 3/1998 | Knox et al. |
| 5,765,950 | A | | 6/1998 | Eno et al. |
| 6,063,001 | A | | 5/2000 | Suhling et al. |
| 6,068,444 | A | | 5/2000 | Sheth |
| 6,300,699 | B1 | | 10/2001 | Parmeter |
| 6,440,033 | B1 | | 8/2002 | Suhling et al. |
| 6,561,697 | B2 | | 5/2003 | Tsui |
| 6,854,517 | B2 | | 2/2005 | Gay et al. |
| 7,309,163 | B2 | | 12/2007 | Dass |
| 2005/0223737 | A1 | | 10/2005 | Conry |

FOREIGN PATENT DOCUMENTS

| | | |
|---|---|---|
| JP | 10-110694 A | 4/1998 |
| JP | 2004-116335 A | 4/2004 |
| JP | 2007-263124 A | 10/2007 |

* cited by examiner

*Primary Examiner* — Jennifer H Gay

(74) *Attorney, Agent, or Firm* — Bracewell & Giuliani LLP

(57) ABSTRACT

A rotary pump having thrust bearings includes a system for equalizing the loading on the thrust bearings. The thrust bearings are each supported on pistons that are in fluid communication with a hydraulic circuit. The hydraulic circuit has substantially the same pressure throughout, thereby floating each piston at the same pressure to provide an equal support force to each thrust bearing via each piston.

15 Claims, 2 Drawing Sheets

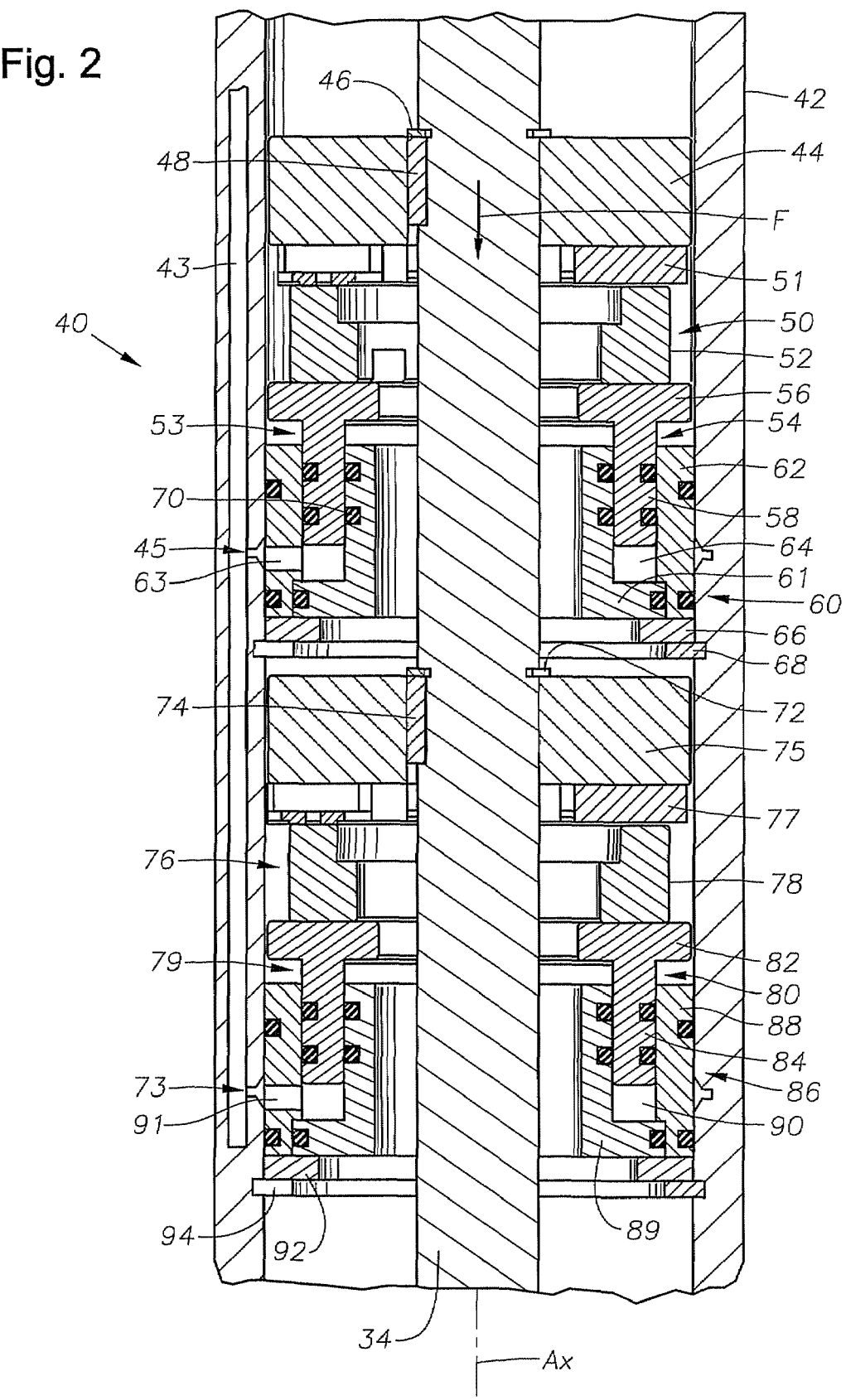

ELECTRICAL SUBMERSIBLE PUMP WITH EQUALLY LOADED THRUST BEARINGS AND METHOD OF PUMPING SUBTERRANEAN FLUID

FIELD OF THE INVENTION

The present disclosure relates in general to electrical submersible well pumps, and in particular to a system and method for equally distributing forces applied to thrust bearings in a centrifugal pump.

BACKGROUND OF THE INVENTION

Electrical submersible pumps (ESP) are normally installed on the bottom end of jointed production tubing within a cased wellbore and powered by a power cable typically attached to the outside of production tubing. In this configuration, an annulus is formed between the tubing and the wellbore casing and the produced fluids are pumped up the production tubing to the surface.

The ESP pumps typically have a large number of stages, each stage having a stationary diffuser and a rotating impeller. The rotating impellers exert a downward thrust as the fluid is moved upward. The downward force is generally handled by a thrust bearing radially mounted on the pump shaft. Size constraints in a producing well limit the thrust bearing diameter and thus its load bearing capacity. To prevent bearing overload in some pumps, additional thrust bearings have been added at different locations along the shaft length. Attempts to distribute the load equally to the bearings include the use of springs and linkages. However these attempts have not been able to provide equal loading distribution.

SUMMARY OF THE INVENTION

Disclosed herein is an apparatus for handling axial thrust imposed by a rotary pump on a drive shaft. The apparatus includes a housing, a drive shaft for driving a rotary pump extending into the housing, and piston assemblies within the housing. Each piston assembly has a piston and cylinder arrangement within the housing. Fluid is in the cylinder and the cylinders are in fluid communication with each other. Thrust bearings are also included that are coupled to the drive shaft. Each thrust bearing is supported on a piston assembly, wherein each bearing receives and transfers the thrust through the fluid in the cylinder to the housing. The force exerted onto each thrust bearing is equalized by pressure communicated through the fluid. The apparatus may further include a hydraulic circuit for handling the fluid and directing it to the piston assemblies. A plenum may be formed in the housing as part of the hydraulic circuit.

Also described herein is an alternative apparatus for pumping well fluid. The apparatus includes a rotary pump, a drive shaft adapted to be driven by a power source and located within a housing to drive the pump. Also included are piston assemblies within the housing, the piston assemblies may include a piston in a cylinder and wherein the cylinder has fluid within. A hydraulic circuit provides fluid communication between the cylinders so each cylinder is at substantially the same pressure. This embodiment may include a plenum in the housing wall with ports between the plenum and the cylinders. Thrust bearings are included within the housing coupled to the drive shaft. A piston assembly is mounted to each thrust bearing for receiving thrust and transferring the thrust through the fluid in the cylinder to the housing. Each thrust bearing may include a thrust runner connected to the drive shaft. The thrust runners rotate with the drive shaft on a mating thrust bearing base, the thrust bearing base does not rotate relative to the housing. Each piston is in cooperative engagement with a thrust bearing bases.

BRIEF DESCRIPTION OF THE DRAWINGS

FIG. 2 is a side sectional view of a system for distributing force between pump thrust bearings.

DETAILED DESCRIPTION OF THE INVENTION

Figure 1:
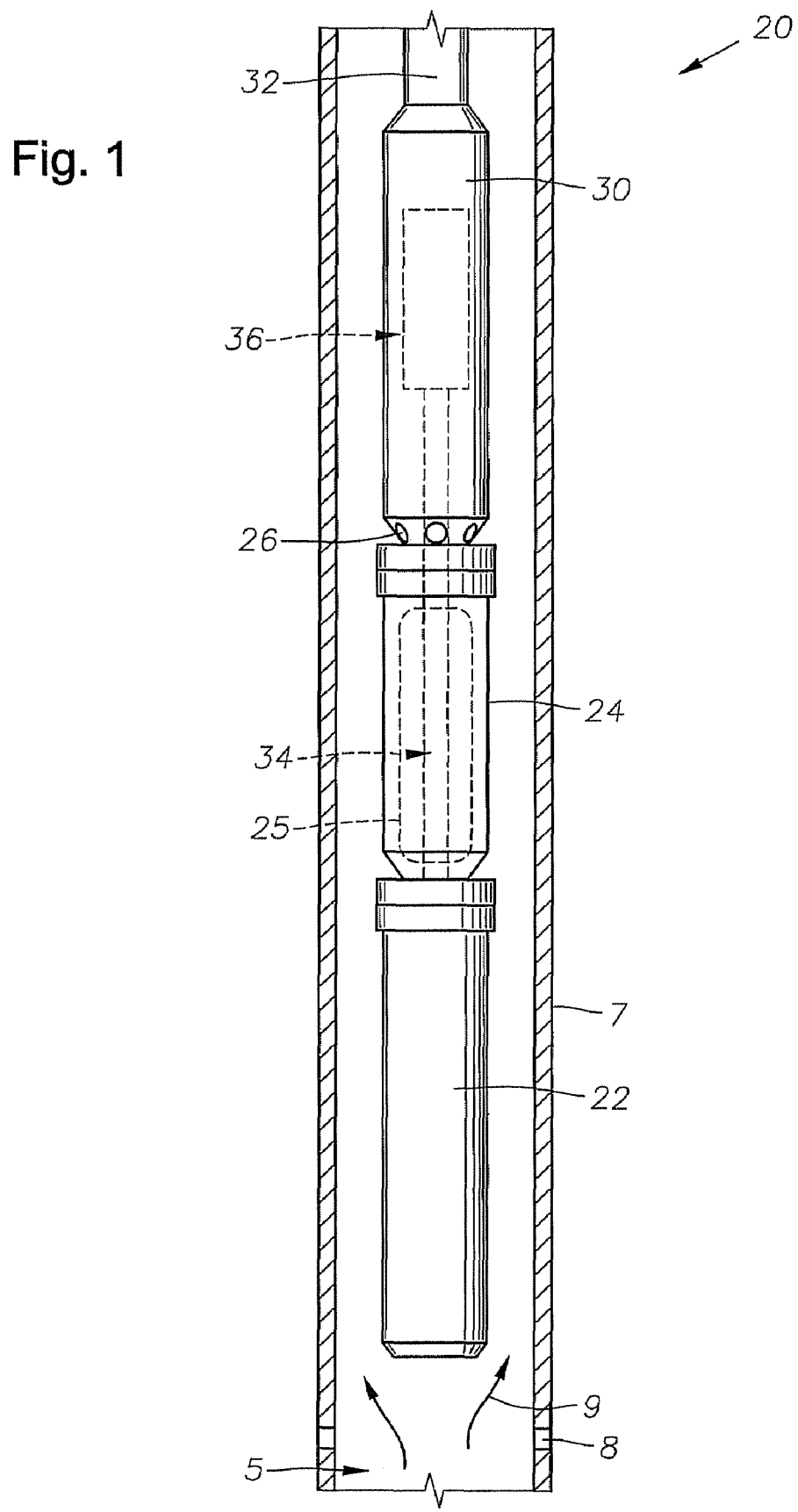
FIG. 1 is a side partial sectional view of an example of an electrical submersible pumping system in a cased wellbore.

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

With reference now to FIG. 1 an example of an electrical submersible pumping (ESP) system 20 is shown in a side partial sectional view. The ESP 20 is disposed in a wellbore 5 that is lined with casing 7. In the embodiment shown, the ESP 20 comprises a motor 22, a seal section 24 attached on the upper end of the motor 22, and a pump 30 above the seal 24. Fluid inlets 26 shown on the outer housing of the pump 30 provide an inlet for wellbore fluid 9 in the wellbore 5 to enter into the pump section 30. A gas separator (not shown) could be mounted between the seal section 24 and the pump section 30.

In an example of operation, the pump motor 22 is energized via a power cable (not shown) and rotates an attached shaft assembly 34 (shown in dashed outline). Although the shaft 34 is illustrated as a single member, it should be pointed out that the shaft 34 may comprise multiple shaft segments. The shaft assembly 34 extends from the motor 22 through the seal section 24 to the pump section 30. Impellers 36 (also shown in dashed outline) within the pump section 30 are coupled to the shaft 34 assembly upper end that rotate in response to shaft 34 rotation. The impellers 36 comprise a vertical stack of individual members alternatingly interspaced between static diffusers (not shown). Well bore fluid 9, which may include liquid hydrocarbon, gas hydrocarbon, and/or water, enters the wellbore 5 through perforations 8 formed through the casing 7. The wellbore fluid 9 is drawn into the pump 30 from the inlets 26 and pressurized as the rotating impellers 36 urge the wellbore fluid 9 through a helical labyrinth upward through the pump 30. The pressurized fluid is directed to the surface via production tubing 32 attached to the upper end of the pump 30.

As discussed above, operating the impellers 36 produces a resulting downward force on the shaft 34 that is realized by thrust bearings within the ESP 20. Such an upward thrust can also occur during pump start up. FIG. 2 which illustrates a thrust bearing assembly 40 embodiment in side sectional view having tandem thrust bearings 50, 76 configured to support axial loads exerted by the shaft 34. A tubular housing 42 encloses the thrust bearing assembly 40 therein. Although two thrust bearings 50, 76 are shown in FIG. 2, the system and method described herein includes embodiments having more than two thrust bearings. Moreover, the thrust bearing assembly 40 may be provided at any point on the shaft 34 between the motor 22 and impellers 36. For example, the thrust bearing assembly 40 could be located within the seal section 24 or the motor 22. A bladder 25 is shown (in dashed outline) included within the seal section 24 for equalizing ESP system 20 internal and external pressure. The bladder 25 outer surface is contacted by wellbore fluid 9 and dielectric fluid against the bladder 25 inner surface communicates with the motor 22. The bladder 25 communicates the fluid 9 pressure to the system 20 internals via the dielectric fluid without allowing fluid 9 leakage into the dielectric fluid.

One of the advantages presented herein is the shaft 34 downward axial load, referred to herein and illustrated as force F, is distributed substantially equally to each thrust bearing. As noted above, the force F, which largely is transferred along the shaft 34 axis $A_X$, initiates from impellers 36 action on the fluid being pumped. Axial force F is transferred from the shaft 34 via annular shaped thrust spaced runners 44, 75. The thrust runners 44, 75 are shown coupled to the drive shaft 34 outer circumference with elongated keys 48, 74 that radially affix the runners 44, 75 to the shaft 34. Corresponding recesses in the thrust runners 44, 75 and shaft 34 are formed to receive the keys 48, 74 therein. The thrust runners 44, 75 extend outward from the shaft 34 and end proximate to the housing 42 inner circumference without sealing against. Downward axis forces in the shaft 34 are transferred to the thrust runners 44, 75 via snap rings 46, 72 shown engaging the shaft 34 in a groove adjacent the thrust runners' 44, 75 upper surface.

The thrust bearings 50, 76 each include a base 51, 77 circumscribing the shaft 34 below respective thrust runners 44, 75. The base 51, 77 may comprise a pad formed from a composite material for withstanding the rotating action from the thrust runners 44, 75. In this example each thrust bearing base 51, 77 having an outer diameter less than the thrust runner 44, 75 outer diameter. The thrust bearings 50, 76 further include an annular collar 52, 78 supporting the thrust bearing bases 51, 77, the collar 52, 78 having an upper end with an inner diameter greater than the inner diameter of the thrust bearing bases 50, 76, in the example shown. The collar 52, 78 has an outer diameter less than the outer diameter of the thrust bearings 50, 76. The inner diameter of the collar 52, 78 includes a reduced inner diameter transition at a point along its axis; the collar 52, 78 inner diameter is constant below the transition. The outer diameter of the collar 52, 78 is constant along its entire axial length.

Each collar 52, 78 is shown each supported on respective piston assemblies 53, 79, each piston assembly 53, 79 comprising a piston 54, 80. Each piston 54, 80 comprises a ring like piston base 56, 82 at its upper end and a piston shaft 58, 84 extending downward from the midsection of the piston base 56, 82. Each piston base 56, 82 width exceeds the respective piston shaft 58, 84 width thereby giving each piston 54, 80 a "T" shaped cross section. Each piston shaft 58, 84, as shown, is a cylindrical member. The collar 52, 78 may be coupled on its lower end to each base 56, 82, such as by a dowel (not shown). The piston shafts 58, 84 are shown inserted into correspondingly shaped annular cylinders 64, 90 formed within respective cylinder housings 60, 86. The cylinder housings 60, 86 comprise an inner section 61, 89 and an outer wall 62, 88. Each inner section 61, 89 circumscribes the shaft 34, along an axial length and has a flange on its lower end that radially extends outward from the shaft 34 thereby giving the inner sections 61, 89 an "L" shaped cross section. In the embodiment shown, the outer walls 62, 88 are ring like members having a lower end sealingly coupled with the outer edge of the flange of the inner sections 61, 89. Each outer wall 62, 88 has an outer surface in sealing cooperation with the housing 42 inner circumference. Passages 63, 91 laterally extend through each outer wall 62, 88 located adjacent the lower ends of the cylinders 64, 90 and in fluid communication with the cylinders 64, 90.

The cylinder housings 60, 86 are each supported on support rings 66, 92 that are held within the housing 42 on top of snap rings 68, 94. The support rings' 66, 92 outer circumferences largely match the housing 42 inner surface, and each snap ring 68, 94 has an outer diameter extending into a groove formed into the housing 42 inner circumference.

A plenum 43 is shown formed within the housing 42 wall extending axially from above the upper piston assembly 53 to below the lower piston assembly 79. The plenum 43 angular travel, as illustrated, is less than 360°, but embodiments exist where the plenum 43 angular travel extends up to 360°. Circular grooves 45, 73 are provided in the housing 42 wall that circumferentially traverse the housing 42 inner circumference that register with the passages 63, 91. Registering the passages 63, 91 with the grooves 45, 75 provides fluid communication between the cylinders 64, 90 and the plenum 43. The plenum 43 preferably contains an incompressible fluid that may be introduced through a fitting (not show) connecting the outer surface of the housing 42 and plenum 43. The fluid may be at ambient pressure or pressurized. Introducing a fluid, such as a hydraulic or dielectric fluid, into the cylinders 64, 90 and plenum 43 thereby forms a hydraulic circuit, wherein the hydraulic circuit pressure is substantially consistent throughout. O-ring seals 70 are illustrated on the pistons 54, 80 and cylinder housings 60, 86.

In operation, the force F on the shaft 34 urges both thrust runners 44, 75 downward against the thrust bearings 50, 76. The force F then transmits via the collar 52, 82 and piston 54, 80 into fluid within the cavity 64, 90. Both cavities 64, 90 are in fluid and pressure communication with one another via the plenum 43, therefore have substantially equal pressure. The substantially equal pressure in each cavity 64, 90 results in a correspondingly substantially equal upward force exerted on each piston 54, 80. Each piston 54, 80 has a substantially equal reactive force, thereby equalizing the force experienced on each thrust bearing 50, 76. The equalized force reduces unequal loading on either bearing 50, 76 to enhance bearing life. An increase in downward force pushes both thrust runners 44, 75 down along with the shaft 34. This in turn urges fluid up into the plenum 43 and into the seal section 24 interior and slightly compresses bladder 23.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. While the invention has been shown in only one of its forms, it should be apparent to those skilled in the art that it is not so limited but is susceptible to various changes without departing from the scope of the invention. For example, the device herein described herein is employable on a surface mounted rotary pump, rotary pumps other than centrifugal, as well as progressive cavity pumps.

The invention claimed is:

1. An apparatus for pumping well fluid, comprising:
    a submersible rotary pump assembly having a rotatable driven drive shall driven by a motor;
    a housing forming part of the pump assembly, the drive shall extending into the housing;
    first and second annular chambers that are fixed in the housing at strategic locations along an axis of the drive shaft;
    first and second annular pistons extending sealingly into the first and second chambers, respectively, and a fluid disposed in each of the chambers;
    a communication passage communicating the fluid in the first chamber with the fluid in the second chamber;
    annular first and second thrust runners mounted to the shaft axially and rotationally; and
    annular first and second thrust bearing bases within the housing and being rotatably engaged by the first and second thrust runners, respectively, the first and second thrust bearing bases being axially movable with the first and second pistons, respectively, wherein down thrust imposed by the pump on the shaft through the first and second thrust runners transfers to the first and second thrust bearing bases and through the fluid in the first and second chambers to the housing.

2. The apparatus of claim 1, wherein the communication passage extends through a wall of the housing in fluid communication with each of the chambers.

3. The apparatus of claim 1, wherein the submersible rotary pump assembly further comprises:
    a seal section located between the pump and the motor and containing a bladder for equalizing lubricant pressure within the motor with well fluid pressure on an exterior of the motor; and
    wherein the housing comprising a component of the seal section.

4. The apparatus of claim 1, wherein the communication passage comprises a plenum formed within a wall of the housing, and ports provided in a wall of the between the plenum and the chambers.

5. The apparatus of claim 1, wherein the fluid in each of the chambers is under a selected charged pressure when no axial thrust exists.

6. The apparatus of claim 1, further comprising annular collars, each disposed between and in contact with one of the thrust bearing bases and one of the pistons, each of the collars being axially movable in unison with the corresponding piston.

7. The apparatus of claim 1, wherein each of the chambers comprises:
    a cylindrical outer wall in engagement with an inner diameter of the housing; and
    a cylindrical inner wall circumscribing and radially spaced from the drive shaft, the inner wall being, concentrically located within the outer wall and defining one of the chambers between the inner and outer walls for receiving one of the pistons.

8. The apparatus of claim 1 wherein each of the pistons comprises a cylindrical member having open upper and lower ends, the drive shaft extending through the open first and second ends of each of the pistons; and wherein the upper end is in cooperative engagement with one of the thrust bearing bases and the lower end extends sealingly into one of the chambers.

9. An apparatus for pumping well fluid comprising:
    a rotary pump;
    a drive shaft adapted to be driven by a power source and extending through a housing between the motor and the pump, the drive shaft cooperatively engaging the pump to drive the pump;
    an upper cylinder assembly and a lower cylinder assembly disposed along an axis of the drive shaft within the housing;
    each of the cylinder assemblies comprising an outer cylinder in contact with an inner diameter of the housing and an inner cylinder concentrically located within the outer cylinder;
    a plate extending between lower ends of the inner and outer cylinders of each oldie cylinder assemblies, defining a chamber between the inner and outer cylinders of each of the cylinder assemblies;
    upper and lower annular pistons, each having a lower portion extending sealingly into an upper end of one of the chambers, and a fluid disposed in each of the chambers;
    a plenum formed within a side wall of the housing, and ports provided in the housing side wall and the outer cylinder of each of the cylinder assemblies between the plenum and the chambers;
    upper and lower thrust runners axially and rotationally coupled to the drive shaft; and
    upper and lower thrust bearing bases within the housing and being rotatably engaged by the upper and lower thrust runners, respectively, the bases being in cooperative engagement with the pistons for axial movement with the pistons; and wherein
    the thrust runners transfer down thrust imposed on the drive shaft by the pump to the thrust bearing bases, which transfer the down thrust through the pistons and the fluid in the chambers to the housing.

10. The apparatus of claim 9, wherein each of the pistons comprises an upper portion having a radial width greater than a radial width of its respective chamber so as to limit downward movement of the lower portion of the piston into the chamber; and wherein
    the upper portion of each of the pistons is in cooperative engagement with one of the thrust bearing bases.

11. The apparatus of claim 9, wherein the fluid is incompressible.

12. The apparatus of claim 9, further comprising an annular collar disposed between each of the thrust bearing bases and the corresponding piston, wherein each of the collars transfers down thrust from one of the thrust bearing bases to one of the pistons.

13. A method of pumping subterranean fluid from a wellbore, the method comprising:
    providing a pumping system in the wellbore on production tubing, the system having a motor, a rotary pump with impellers, a drive shaft coupled between the impellers and the motor, and an annular thrust bearing system located within a housing, the thrust bearing system having annular thrust runners each thrust runner rotatably and axially engaged with the drive shaft and in rotating engagement with an annular thrust bearing base, each of the thrust bearing bases being in cooperative engagement with an annular piston, each of the pistons extending sealingly into a chamber fixed to the housing and being axially movable relative to the housing and the chambers, the chambers being connected to each other by a hydraulic circuit having fluid therein at substantially the same pressure throughout the circuit;

activating the motor, thereby rotating the drive shaft and coupled impellers, which creates a down thrust on the drive shaft; and transferring the down thrust on the drive shaft to the thrust runners, which in turn transfer the down thrust through the thrust bearing bases to the pistons, the pistons transferring the down thrust through the fluid within each of the chambers to the housing.

14. The method of claim 13, further comprising providing pressure communication between the fluid in the hydraulic circuit and ambient conditions.

15. The method of claim 13, wherein the fluid in the hydraulic circuit and the chambers is substantially incompressible.

* * * * *

UNITED STATES PATENT AND TRADEMARK OFFICE
CERTIFICATE OF CORRECTION

| | | |
|---|---|---|
| PATENT NO. | : 7,987,913 B2 | Page 1 of 1 |
| APPLICATION NO. | : 12/238649 | |
| DATED | : August 2, 2011 | |
| INVENTOR(S) | : Larry J. Parmeter | |

It is certified that error appears in the above-identified patent and that said Letters Patent is hereby corrected as shown below:

IN THE SPECIFICATION:

Column 3, line 49, delete "having" and insert --has--
Column 3, line 61, delete "each"

IN THE CLAIMS:

Column 5, line 45, claim 3, delete "comprising" and insert --comprises--
Column 6, line 22, claim 9, delete "oldie" and insert --of the--
Column 7, line 11, claim 13, delete "transfer" and insert --transfers--

Signed and Sealed this
Thirteenth Day of December, 2011

David J. Kappos
*Director of the United States Patent and Trademark Office*